(No Model.)

N. J. McALISTER.
COTTON SEED CRUSHER, PLANTER, AND DISTRIBUTER.

No. 544,741.                    Patented Aug. 20, 1895.

Witnesses
Wm C Dashiell
May E. Moore

Norman J. McAlister
Inventor
By Wm A Moore
Atty

UNITED STATES PATENT OFFICE.

NORMON JAY McALISTER, OF PELZER, SOUTH CAROLINA.

COTTON-SEED CRUSHER, PLANTER, AND DISTRIBUTER.

SPECIFICATION forming part of Letters Patent No. 544,741, dated August 20, 1895.

Application filed April 10, 1895. Serial No. 545,127. (No model.)

*To all whom it may concern:*

Be it known that I, NORMON JAY McALISTER, a citizen of the United States, residing at Pelzer, in the county of Anderson and State of South Carolina, have invented certain new and useful Improvements in Cotton-Seed Crushers, Planters, and Distributers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cotton-seed crushers, planters, and distributers; and the object of my invention is the provision of a machine which will perform its functions in a thorough and perfect manner, and which will possess merit in point of durability and simplicity.

To attain the desired objects the machine consists of certain novel features of construction and combination of parts, substantially as described, and particularly defined by the claims.

Figure 1:
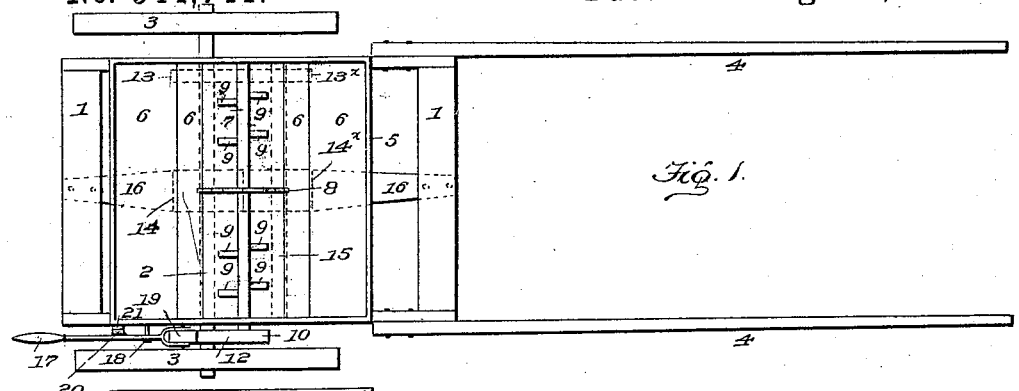
Figure 2:
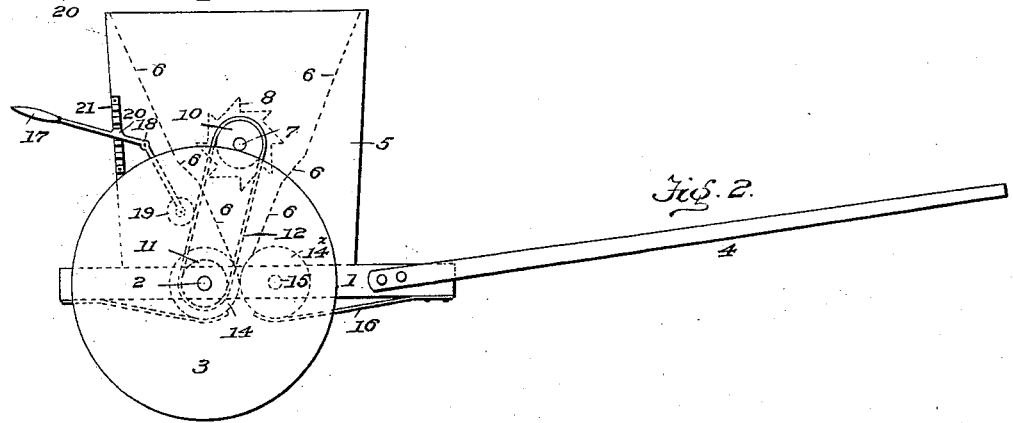
Figure 3:
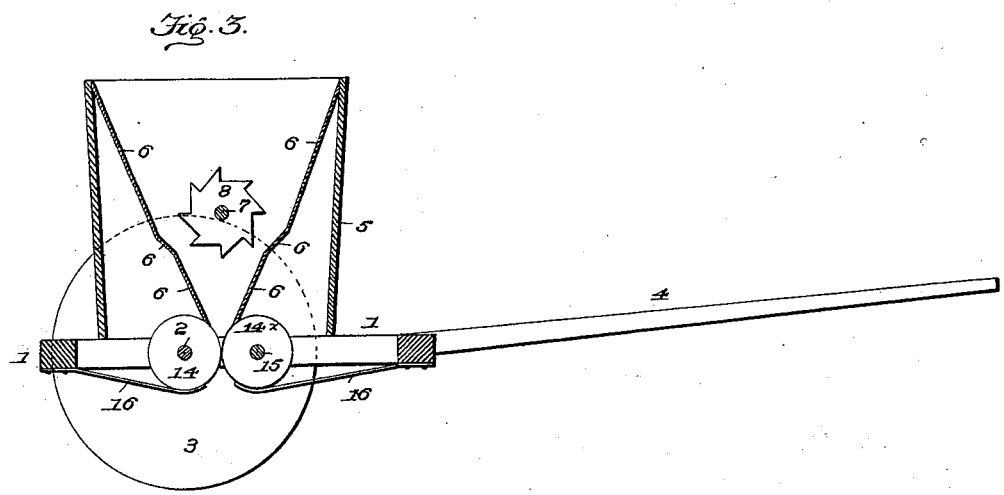

Figure 1 represents a plan view of the machine embodying my invention. Fig. 2 represents a side elevation thereof. Fig. 3 represents a vertical central sectional view.

Referring by numerals to the drawings, the numeral 1 designates the frame of my machine, which is of rectangular form.

2 designates the axle mounted in the frame; 3, the supporting-wheels carried by the axle, and 4 the draft attachment connected to the forward portion of the frame. Upon the frame is mounted the hopper 5, which has the inclined walls 6, and in said hopper is mounted a shaft 7, carrying a saw 8 for mangling, crushing, or cutting the cotton-seed, and on said shaft is mounted the series of angle-shaped stirrers or agitators 9, and to one end of said shaft is secured a groove-pulley 10, over which and the groove-pulley 11 on the axle passes the belt 12. On the axle is also mounted the gear-wheel 13 and the smooth-faced crushing wheel or disk 14, and parallel with the axle is mounted the shaft 15, carrying the crushing wheel or disk 14$^\times$ and the meshing gear-wheel 13$^\times$. Secured to the frame on its under side are the scrapers 16, which have their outer ends connected to the frame and their inner ends curved around and bearing upon the under face of the crushing-wheels and serve to remove any clinging particles of the seed from the surface of the wheels.

To insure the running of the saw at all times and under all conditions, I provide the belt-tightening device which consists of the lever 17, pivoted at 18 and having the wheel 19 bearing upon the band or belt 12, and having the arm 20, which engages the rack 21, secured to the hopper for holding the belt-tightening device at any point.

In operation when it is desired to use the machine as a combined planter and distributer the seed and fertilizer are placed in the hopper and are thoroughly mixed by means of the saw and agitators, and the rollers reduce the fertilizer to powder and the seed and fertilizer fall between the rollers into the furrows.

I claim—

1. The combination of the frame, the axle mounted therein, and carrying the supporting wheels, the hopper supported on the axle, the gear wheel, crushing wheel and pulley secured on the axle, the shaft carrying the gear wheel and crushing wheel, the scrapers secured to the under side of the frame and having their free ends bearing against the under face of the crushing wheels, the shaft carrying the saw and the pulley and the belt connecting the pulley on the shaft and on the axle.

2. The combination of the frame, the axle and shaft mounted therein, the hopper supported on the frame, the crushing wheels on the axle and shaft, the scrapers secured to the under side of the frame and having their curved free ends bearing upon the under face of the rollers, the meshing gear wheels on the axle and shaft, the shaft journaled in the upper portion of the hopper and carrying the saw and pulley, the pulley on the axle, the belt passing over said pulleys, and the belt tightening device pivoted to the hopper and having one end bearing upon the belt.

In testimony whereof I affix my signature in presence of two witnesses.

NORMON JAY McALISTER.

Witnesses:
 J. A. HARVEY,
 T. A. McELROY